United States Patent [19]

Swanberg et al.

[11] Patent Number: 5,707,078
[45] Date of Patent: Jan. 13, 1998

[54] AIR BAG MODULE WITH ADJUSTABLE CUSHION INFLATION

[75] Inventors: Jeffrey Scott Swanberg, Clarkston; James Peter Karlow, Milford, both of Mich.

[73] Assignee: Takata, Inc., Auburn Hills, Mich.

[21] Appl. No.: 756,815

[22] Filed: Nov. 26, 1996

[51] Int. Cl.$^6$ .................................................. B60R 21/26
[52] U.S. Cl. ........................ 280/739; 280/735; 280/736; 280/742
[58] Field of Search ................... 280/728.1, 742, 280/739, 740, 736, 735

[56] References Cited

U.S. PATENT DOCUMENTS

| | | | |
|---|---|---|---|
| 4,394,033 | 7/1983 | Goetz et al. | 280/736 |
| 4,846,368 | 7/1989 | Goetz | 280/736 |
| 5,234,229 | 8/1993 | Gordon | 280/742 |
| 5,269,561 | 12/1993 | Davis et al. | 280/742 |
| 5,330,226 | 7/1994 | Gentry et al. | 280/739 |
| 5,388,860 | 2/1995 | Brede et al. | 280/739 |
| 5,413,378 | 5/1995 | Steffens, Jr. et al. | 280/739 |
| 5,524,925 | 6/1996 | Rose et al. | 280/739 |

*Primary Examiner*—Eric D. Culbreth
*Attorney, Agent, or Firm*—Harness, Dickey & Pierce, PLC

[57] ABSTRACT

An air bag module with adjustable cushion inflation is provided by including a valve member in the module which is movable to change the size of an inflation outlet through which inflation fluid flows into an air cushion while simultaneously changing the size of a vent outlet which enables inflation fluid to be vented to the ambient atmosphere. The valve member is positioned by a control unit which receives input from various sensors within the vehicle regarding such factors as ambient temperature, occupant position, occupant weight, seat belt usage, etc to produce an optimum cushion inflation based upon these factors.

14 Claims, 3 Drawing Sheets

AIR BAG MODULE WITH ADJUSTABLE CUSHION INFLATION

BACKGROUND AND SUMMARY OF THE INVENTION

The present invention relates to air bag modules and in particular to an air bag module having adjustable inflation of the air cushion.

It is well known to provide a motor vehicle with an occupant restraint system comprised of an air bag module having an inflatable air cushion, an inflator for generating or storing a supply of an inflation fluid and a reaction canister for housing the inflator and the folded air cushion. The inflator releases inflation fluid in response to a signal indicative of a vehicle deceleration of at least a predetermined magnitude. The released inflation fluid is directed from the inflator, through an inflation outlet in the canister and into the air cushion to inflate the cushion.

The pressure to which the air cushion is inflated will determine the performance characteristics of the air cushion. The optimum pressure for the air cushion will vary depending upon a variety of conditions or factors such as the pre-accident occupant position, belt usage, presence or absence of a rearward facing child seat, the size of the occupant and other factors. In addition, it is known that the pressure of the inflation fluid released from the inflator varies as a function of the ambient temperature. Accordingly, it is desirable to provide for adjustable cushion inflation depending upon one or more reluctant factors.

It is an object of the present invention to provide an electronically adjustable cushion inflation to adjust the cushion inflation for one or more of these factors.

It is known in the art to provide variable venting of an air bag module depending upon ambient temperature and other factors. Variable venting is accomplished by a valve member mounted to the canister that is movable to either increase or decrease the size of the canister vent outlets, enabling either more or less inflation fluid to be vented from the canister as opposed to being directed into the air cushion. However, applicants have found that a greater degree of adjustability of the cushion inflation, as well as a greater control of the cushion inflation can be achieved with the use of a valve member that not only controls the size of the vent outlet, but also controls the size of the inflation outlet between the inflator and the air cushion.

The module of the present invention includes a valve member movably mounted to the canister to direct the proportioning of the inflation fluid between the inflation and vent outlets. The valve member can be moved in one direction to simultaneously increase the size of the inflation outlet into the air bag while decreasing the size of the vent outlet to increase air cushion inflation. Likewise, the valve member can be moved in an opposite direction to decrease the size of the inflation outlet into the air bag while increasing the size of the vent outlet to decrease air cushion inflation. By changing the size of both the inflation outlet and the vent outlet at the same time, less displacement of the valve member is required to accomplish a given adjustment, compared to changing only the size of the vent outlet.

Sensors incorporated into the occupant compartment of the vehicle provide signals to an electronic control unit (ECU). These include sensors to sense pre-accident occupant position, belt usage, presence or absence of a rearward facing child seat, occupant weight, ambient temperature and other relevant factors. The inflation profiles pre-programmed within the ECU are derived from previous empirical and analytical testing of crash performance of the vehicle under sensed conditions. The selected inflation profile provides a control signal to an electric drive unit on the air bag module to position the valve member to permit the module to provide the desired air bag inflation for the sensed conditions. The inflation and vent outlet sizes and valve member location are determined as part of system development for the specific vehicle application, and are pre-set at the time of manufacture of the module.

The position of the valve member is periodically adjusted by the control system based on changing conditions as detected by the various sensors. As conditions change, the control signal from the ECU will adjust the valve member position to vary the proportioning of inflation fluid. Correct positioning of the valve member is verified by a valve position sensor. The ECU contains circuitry comparing the commanded position with the actual position of the valve member. If a significant difference exists, the circuitry may provide an additional control signal to the electric drive unit on the valve member. If a correct position of the valve member is not then achieved, the circuitry may issue an error message which can be used to warn the vehicle operator of a system fault.

In one embodiment of the invention, infinitely adjustable proportioning of the inflation fluid is achieved with the valve member being infinitely positionable within a range of positions. In another embodiment, discrete valve member positions are achieved which produce specific inflation profiles for the air cushion. An electromagnet, solenoid or other device can be used to move the valve member between the discrete positions.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
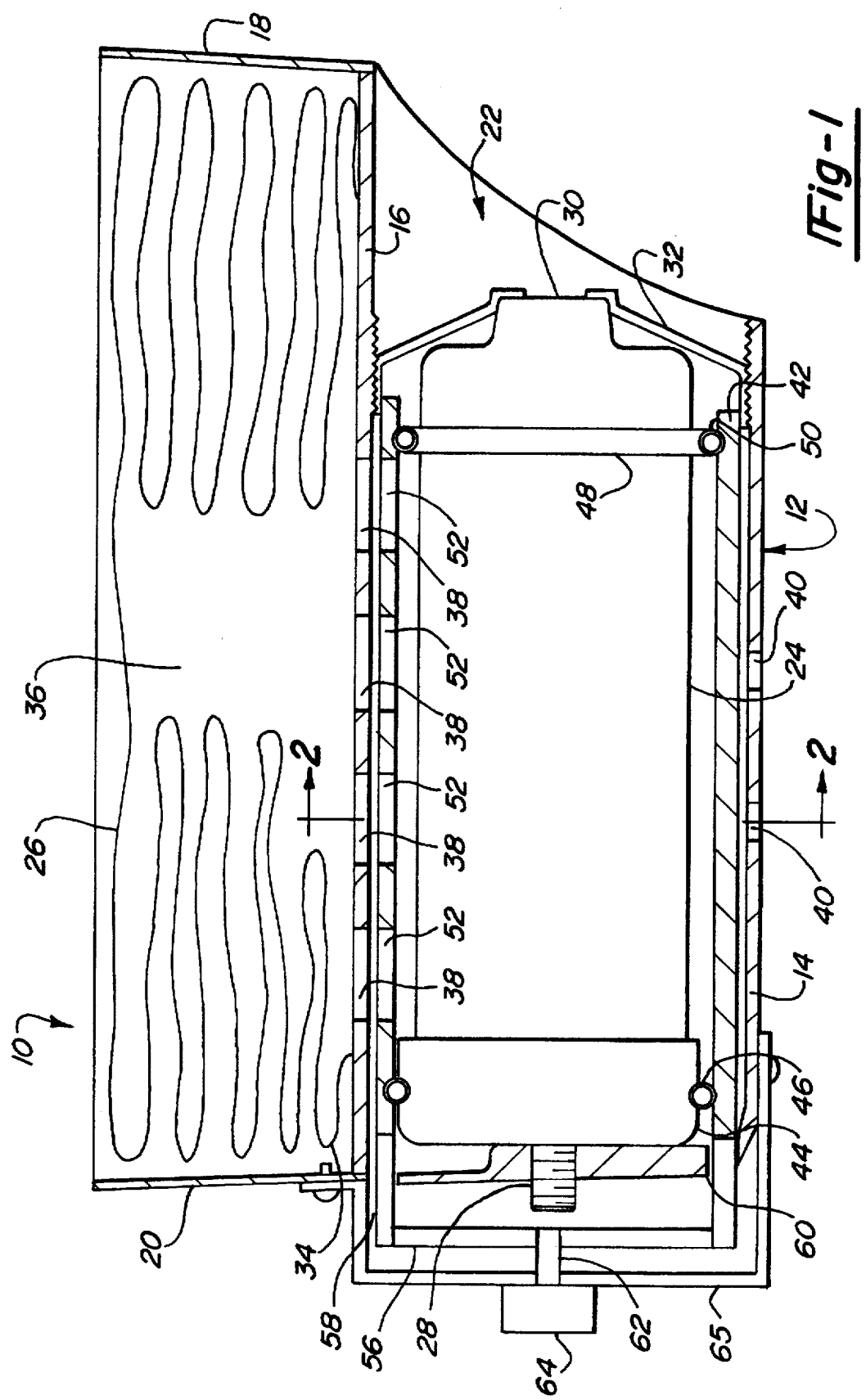
FIG. 1 is a side sectional view of an air bag module with adjustable cushion inflation according to the present invention.

The air bag module of the present invention with adjustable cushion inflation is shown in FIG. 1 and labeled generally at 10. Module 10 includes a reaction canister 12 which is comprised of various walls, including walls 14, 16, 18 and 20. The reaction canister forms the structure of the module and is used to mount the module within a motor vehicle (not shown). The walls of the canister cooperate to form a generally cylindrical chamber 22. An inflator 24 is mounted within the chamber 22. The inflator 24 produces or stores an inflation fluid for inflating an air cushion 26. Air cushion 26 is also mounted to the canister and is separated from the inflator by the wall 16.

The inflator 24 has a mounting stud 28 extending from one end, through the canister wall 20, for mounting the inflator to the canister. The opposite end of the inflator includes an ignitor 30 which rests within an end-cap 32 in the canister.

The air cushion 26 has an open end 34 for receiving inflation fluid into the interior 36 of the air cushion. The air cushion 26 is mounted to the canister in a conventional manner (not shown).

One or more inflation outlets 38 are formed in the wall 16 separating the inflator from the air cushion. The inflation fluid flows from the inflator, through the outlets 38 and into the air cushion. The canister wall 14 is formed with one or more vent outlets 40 which are used to exhaust a portion of the inflation fluid from the canister to the surrounding atmosphere.

According to the present invention, the module 10 is further provided with a valve member in the form of a cylindrical sleeve 42 for controlling the flow of inflation fluid through the inflation outlets 38 and the vent outlets 40. The sleeve 42 surrounds the inflator 24 and is rotatable about the inflator upon a rear bearing cup 44 with bearing 46 and a front bearing ring 48 with bearing 50.

Figure 2:
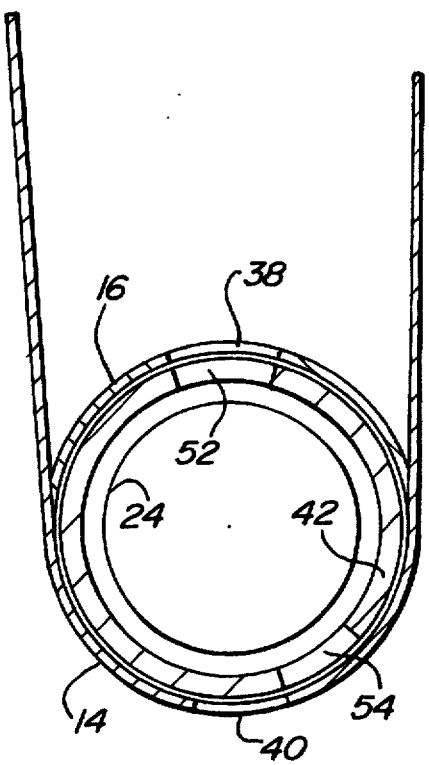
FIG. 2 is a sectional view of the module as seen from substantially the line 2—2 of FIG. 1.

The sleeve has inflation apertures 52 and exhaust apertures 54 (shown in FIG. 2.) In the open, inflation position of the sleeve shown in FIG. 2, the inflation apertures 52 of the sleeve 42 are aligned with the inflation outlets 38 in the canister, enabling inflation fluid to flow from the inflator into the air cushion. In the open inflation position of the sleeve, the exhaust apertures 54 are radially off-set from the vent outlets 40 in the canister such that no or little inflation fluid is vented from the canister.

The sleeve 42 is coupled to a yolk 56 which extends through arcuate openings 58 and 60 in the canister wall 20. The yolk 56 is coupled to the output shaft 62 of a drive motor 64. A bracket 65 mounts the motor 64 to the canister.

Clockwise rotation of the sleeve 42 as viewed in FIG. 2 will result in the gradual closing of the inflation outlets 38 and the simultaneous opening of the vent outlets 40. As this occurs, less inflation fluid will flow into the air cushion. Thus, by changing the rotational position of the sleeve 42, the inflation of the air cushion 26 is adjusted.

Figure 3:
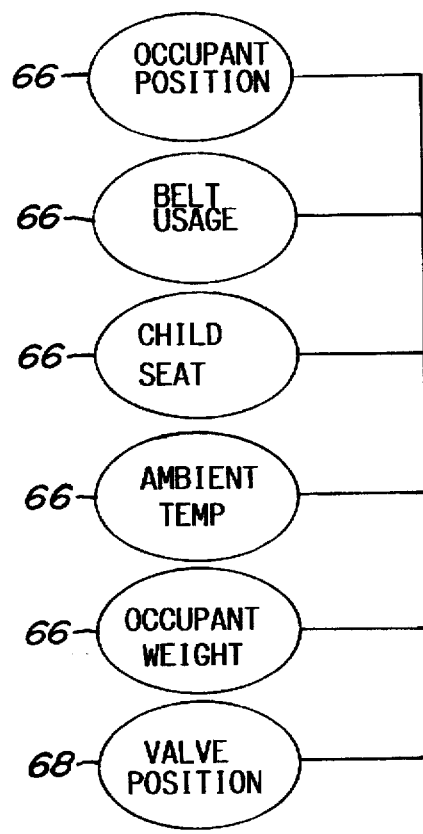
FIG. 3 is schematic illustration of a control circuit for adjusting the air cushion inflation.
Figure 7:
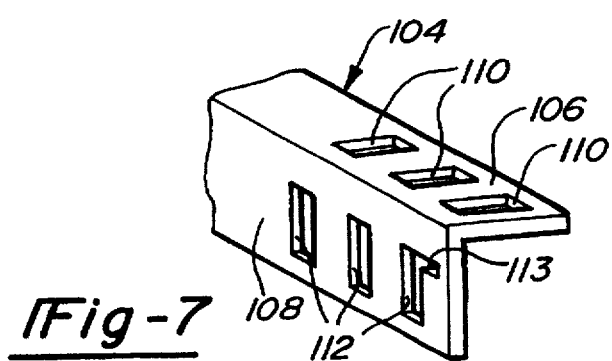
FIG. 7 is a perspective view of the sliding diffuser shown in FIGS. 4, 5 and 6 for adjusting cushion inflation.
Figure 4:
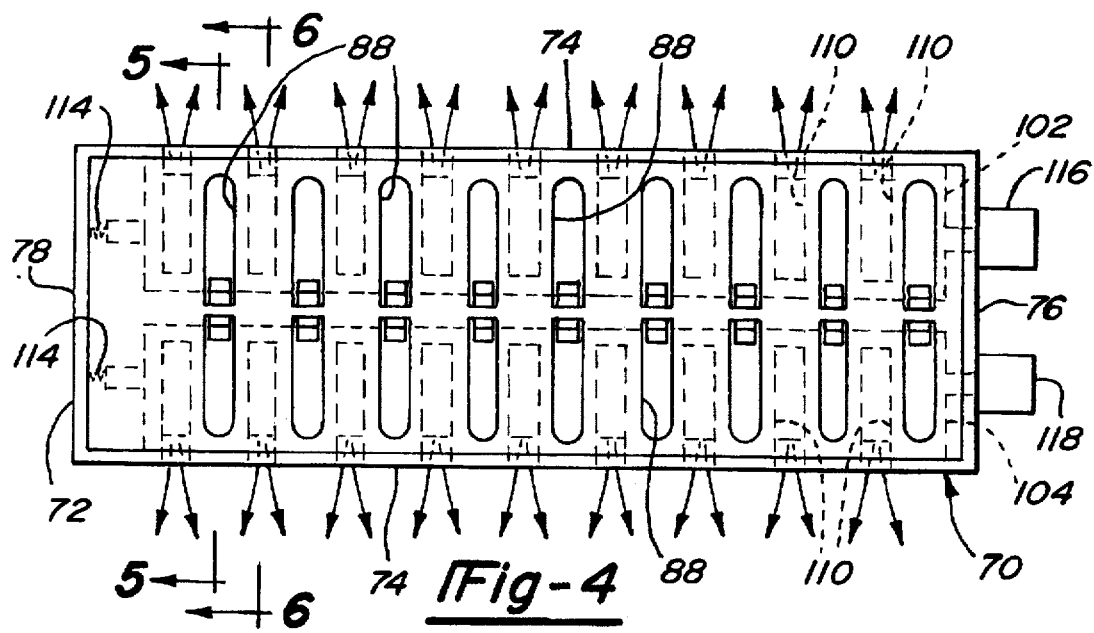
FIG. 4 is a plan view of the reaction canister of an alternative embodiment of the air bag nodule with adjustable cushion inflation according to the present invention.
Figure 5:
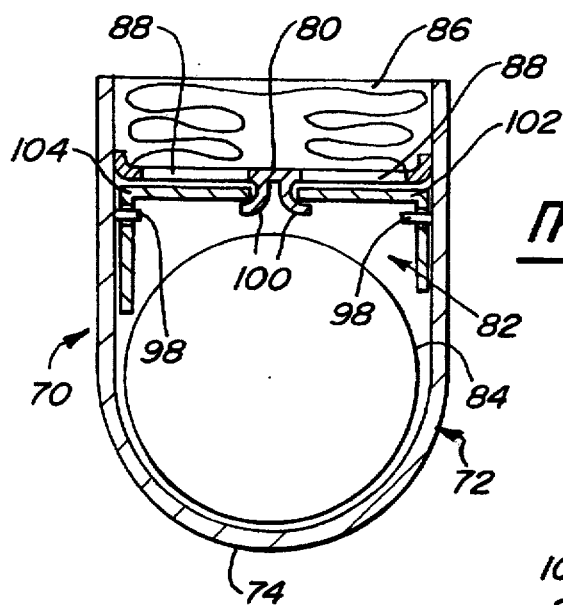
FIG. 5 is a sectional view of the reaction canister as seen substantially the line 5—5 of FIG. 4.

The sleeve position is controlled by a control circuit shown schematically in FIG. 3. A plurality of sensors 66 determine such conditions as occupant position, belt usage, presence of a rear-facing child seat, ambient temperature, occupant weight and other factors which may be relevant to determining the desired air cushion inflation. In addition, a sensor 68 is provided for determining the current position of valve member 42. These sensors provide input to an electronic control unit 70 which contains the required signal processing circuitry and decision algorithms to control the motor 64 to position the sleeve to produce the optimum inflation of the air cushion for the sensed conditions. The position of the sleeve is periodically adjusted by the control circuit based on changing conditions as detected by the sensors. As conditions change, the control signal from the ECU will adjust the sleeve position to vary the proportion of fluid flowing into the air cushion.

An alternative embodiment of the air bag module with adjustable cushion inflation is shown in FIGS. 4–7. An air bag module 70 is shown having a reaction canister 72 formed by walls 74, 76 and 78. A fixed diffuser 80 is attached to the U-shaped wall 74 to define a chamber 82 which houses an inflator 84. Air cushion 86 is attached to the canister on the opposite side of the fixed diffuser 80 from inflator 84. The fixed diffuser has a plurality of inflation outlets 88 which allow inflation fluid to pass from the chamber 82 into the air cushion 86 to inflate the air cushion.

Figure 6:
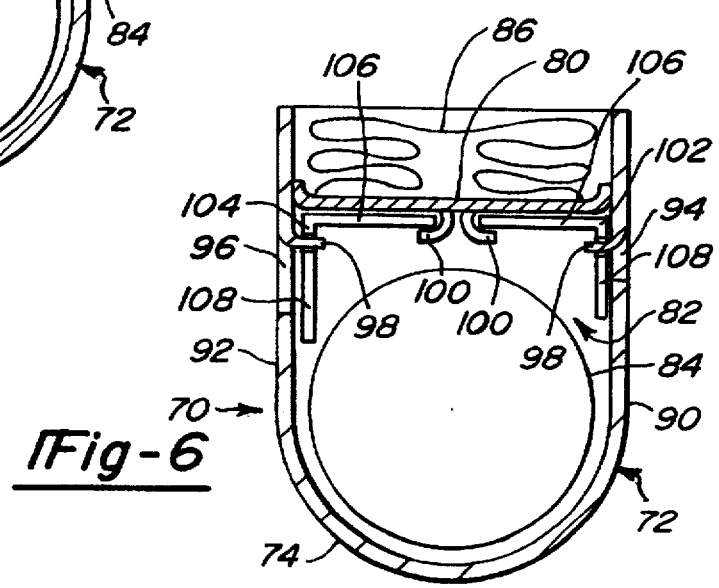
FIG. 6 is a sectional view of the reaction canister as seen substantially the line 6—6 of FIG. 4.

With reference to FIG. 6, the U-shaped canister wall 74 has opposite side portions 90 and 92. The side portion 90 is formed with vent outlets 94 while the side portion 92 is formed with a vent outlet 96. Vent outlets 96 are larger then the vent outlets 94 for a purpose to be described below. The formation of some of the vent outlets 94 and 96 produces inward extending tabs 98. Likewise, the formation of the inflation outlets 88 in the fixed diffuser produces tabs 100. The tabs 98 and 100 are used to form guides for mounting sliding diffusers 102 and 104. The sliding diffusers are generally L-shaped, having a horizontal portion 106 and a vertical portion 108. The horizontal portion is formed with a plurality of inflation apertures 110 while the vertical portion is formed with vent apertures 112. Some of the vent apertures 112 are formed with an extension 113. The tabs 98 extend through the apertures 112 having these extensions to enable the diffusers to slide relative to the canister.

The apertures in the sliding diffusers are arranged with respect to the outlets in the canister such that the position of the sliding diffusers proportions the flow of the inflation fluid between the air cushion and venting to the atmosphere. Springs 114 at one end of the sliding diffusers serve to bias the diffusers to a normal position in which the inflation outlets are opened and the vent outlets are closed. By moving the sliding diffusers in opposition to the springs 114, the inflation outlets are closed and the vent outlets are opened to vent the inflation fluid and thereby reduce the inflation of the cushion.

Each sliding diffuser is coupled to a linear drive such as electromagnets 116, 118 or a solenoid or other electromechanical device to move the sliding diffusers in opposition to the springs 114. Electromagnet 116 is coupled to the sliding diffuser 102 while electromagnet 118 is coupled to sliding diffuser 104. The electromagnets produce movement of the sliding diffusers from their normal open positions to closed positions in which the inflation outlets are entirely closed and the vent outlets are entirely open. There are only two discrete positions of the sliding diffusers, not an infinite number of positions as available with the motor 64 described above. By activating electromagnet 116, one half of the inflation outlets 88 are closed by sliding diffuser 102 and the vent outlets 94 are opened. Alternatively, activation of electromagnet 118 results in closing the other half of the inflation outlets 88 and opening of the larger vent outlets 96. By forming the vent outlets 96 of a larger size than the vent outlets 94, two different levels of air cushion inflation can be achieved by actuating one or the other of the electromagnets.

The electromagnets are controlled by a control circuit such as the circuit shown in FIG. 3. Alternatively, one of the electromagnets could be replaced with a servo motor to move one sliding diffuser to partially close the inflation outlets and partially open the vent outlets. As with the embodiment described in FIGS. 1–3, the sliding diffusers function as valve members to simultaneously close the inflation outlets and open the vent outlets to achieve adjustment of the air cushion inflation. It is beneficial to adjust the air cushion inflation to achieve optimum performance of the air cushion, depending upon changing conditions such as occupant position, belt usage, the presence of a rear-facing, ambient temperature, occupant weight, etc.

It is to be understood that the invention is not limited to the exact construction illustrated and described above, but that various changes and modifications may be made without departing from the spirit and scope of the invention as defined in the following claims.

We claim:

1. An airbag module for a motor vehicle with adjustable cushion inflation comprising:
   an inflator providing an inflation fluid for an air cushion;
   a reaction canister having walls defining a chamber within which said inflator is disposed;
   an inflatable air cushion mounted to said canister and having an opening for receiving inflation fluid to inflate said air cushion;
   said canister having at least one inflation outlet through which inflation fluid flows from said inflator into said air cushion and said canister having at least one vent outlet in one of said walls through which inflation fluid flows from said inflator to the ambient atmosphere;
   at least one valve member carried by said canister and being movable relative to said at least one inflation outlet and said at least one vent outlet to control flow of inflation fluid through said inflation and vent outlets, said at least one valve member being movable in one direction to increase inflation fluid flow through said at least one inflation outlet and to decrease inflation fluid flow through said at least one vent outlet and said at least one valve member being movable in an opposite direction to decrease inflation fluid flow through said at least one inflation outlet and to increase inflation fluid flow through said at least one vent outlet; and
   means for moving said at least one valve member relative to said inflation and vent outlets.

2. The air bag module of claim 1 wherein said means for moving said at least one valve member is operable in response to signals from at least one condition sensor in the vehicle.

3. The air bag module of claim 1 wherein said at least one valve member is movable between multiple discrete positions.

4. The air bag module of claim 3 wherein said means for moving said at least one valve member includes an electromagnet.

5. The air bag module of claim 1 wherein said at least one valve member is infinitely movable over a range of positions.

6. The air bag module of claim 1 further comprising two inflation outlets, two vent outlets and two valve members with each valve member being movable relative to one of said inflation outlets and one of said vent outlets to control flow of inflation fluid through said one inflation outlet and said one vent outlet; and
   said two vent outlets being of different sizes whereby opening of one vent outlet allows more inflation fluid flow therethrough than opening of the other vent outlet.

7. An airbag module for a motor vehicle with adjustable cushion inflation comprising:
   a generally cylindrical inflator providing an inflation fluid for an air cushion;
   a reaction canister having walls defining a chamber within which said inflator is disposed;
   an inflatable air cushion mounted to said canister and having an opening for receiving inflation fluid to inflate said air cushion;
   said canister having a inflation outlet through which the inflation fluid flows from said inflator into said air cushion and said canister having a vent outlet in one of said walls through which inflation fluid flows from said inflator to the ambient atmosphere;
   a generally cylindrical valve member carried by said canister and surrounding said inflator, said valve member being rotatable relative to said inflation outlet and said vent outlet to control flow of inflation fluid through said inflation and vent outlets, said valve member being rotatable in one direction to increase inflation fluid flow through said inflation outlet and to decrease inflation fluid flow through said vent outlet and said valve member being rotatable in an opposite direction to decrease inflation fluid flow through said inflation outlet and to increase inflation fluid flow through said vent outlet; and
   means for moving said valve member relative to said inflation and vent outlets in response to signals from at least one condition sensor within the vehicle.

8. The air bag module of claim 7 wherein said valve member is infinitely adjustable over a range of positions.

9. The air bag module of claim 7 wherein said valve member has an inflation aperture and a vent aperture and movement of said valve member moves said inflation aperture and said vent aperture into or out of alignment with said inflation and vent outlets of said canister respectively to control the flow of inflation fluid through said inflation and vent outlets respectively.

10. An airbag module with adjustable cushion inflation comprising:
    an inflator providing an inflation fluid for an air cushion;
    a reaction canister having walls defining a chamber within which said inflator is disposed;
    an inflatable air cushion mounted to said canister and having an opening for receiving inflation fluid to inflate said air cushion;
    said canister having two inflation outlets through which inflation fluid flows from said inflator into said air cushion and said canister having two vent outlets in said walls;
    two valve members carried by said canister, each said valve member being movable relative to one of said inflation outlets and one of said vent outlets to control flow of inflation fluid through said one inflation outlet and said one vent outlet, said valve members each being movable in one direction to increase inflation fluid flow through one of said inflation outlets and to decrease inflation fluid flow through one of said vent outlets and each said valve member being movable in an opposite direction to decrease inflation fluid flow through one of said inflation outlets and to increase inflation fluid flow through one said vent outlets; and
    means for moving each said valve member relative to said inflation and vent outlets in response to signals from at least one condition sensor in the vehicle.

11. The air bag module of claim 10 wherein said valve members are movable between plural discrete positions.

12. The air bag module of claim 11 wherein said means for moving said valve members includes two electromagnets said, one said electromagnet for moving each of said valve members.

13. The air bag module of claim 10 wherein said two vent outlets have different sizes whereby opening of one vent outlet allows more inflation fluid flow therethrough than opening of the other vent outlet.

14. The air bag module of claim 10 wherein each of said valve members has an inflation aperture and a vent aperture and movement of each said valve member moves said inflation aperture and said vent aperture thereof into or out of alignment with one of said inflation outlets and one of said vent outlets of said canister respectively to control the flow of inflation fluid through said inflation and vent outlets respectively.

\* \* \* \* \*